United States Patent Office 3,730,914
Patented May 1, 1973

3,730,914
MIXED ALUMINUM SILICON COATINGS COMPOSITIONS
James Patrick Dowd, c/o Napko Corporation, 5300 Sunrise St., Houston, Tex. 77021
No Drawing. Continuation-in-part of abandoned application Ser. No. 13,859, Feb. 24, 1970. This application Sept. 17, 1971, Ser. No. 181,578
Int. Cl. C08g 31/04
U.S. Cl. 260—2 S                    3 Claims

ABSTRACT OF THE DISCLOSURE

Stable polymers are formed when alkoxy aluminum chelates are heated with alkyl alkoxy silicon derivatives. The hard resinous materials thus produced are soluble in a wide variety of organic solvents.

These polymers are particularly useful as binders for metallic pigmented coatings.

---

This application is a continuation-in-part of application Ser. No. 13,859, filed Feb. 24, 1970 and now abandoned.

The present invention relates to the copolymers obtained by reacting alkoxy aluminum chelates with alkoxy silicon compounds and coating materials derived from said copolymers.

It has been unexpectedly found that alkoxy containing silicon compounds with alkoxy aluminum chelates form useful polymers; these polymers can be isolated as hard resins or dissolved in organic solvents to give stable, moisture free solutions.

The polymer solutions have the remarkable new and novel property of being stable over long periods of storage. However, when the resinous organic solution containing the zinc powder in suspension is deposited on a metal substrate, a rapid drying effect occurs and a continuous hard resistant film of high integrity and adhesion is formed. Such films are of high commercial utility for the protection of steel against corrosion when exposed to water, salt water or water containing mists carrying salt and other corrosive vapors.

The reaction between alkoxy silicon compounds and alkoxy aluminum compounds was found to be uncertain and resulted in aluminum oxides, precipitated silicas and nonhomogenous products.

It is an object of this invention to produce homogenous, useful, uniform, high molecular weight polymers from aluminum and silicon alkoxides.

The aluminum alkoxides useful in the preparation of this invention have the general formula $XAl(OR)_2$ where R is monovalent hydrocarbon radical and X is a ligand.

Preferred compounds are aluminum isopropoxide and aluminum secondary butoxide.

These aluminum alkoxides must be chelated before the polymers of this invention can be prepared. This chelation is accomplished with one ligand per aluminum atom. The ligands which may be used are B diketones or B ketoesters, such as 2,4-pentanedione or ethylacetoacetate. A typical chelate useful in preparing polymers of this invention is:

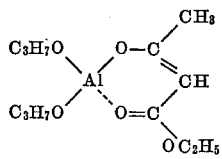

This chelate is easily prepared by mixing aluminum isopropoxide and ethylacetoacetate at room temperature. When the resulting exotherm has subsided the chelate may then be used to prepare the polymer of this invention.

As alkoxy silicon compounds, I may use tetraethyl orthosilicate, tetrabutyl silicate or tetramethyl silicate, methyl triethoxysilane or dimethyldiethoxysilane. Any alkoxy silane having the general formula $R_mSiOR_n$ wherein R is a monovalent hydrocarbon radical and $n$ has a value of 1 to 4 may be used in the preparation of the coating composition of this invention.

Low molecular weight polymers of the above named monomers may also be used. There must not be less than two alkoxy groups attached to each silicon atom however.

It is preferable, but not necessary, to use polymerized alkoxysilanes because of their low volatility. A typical preferred siloxane is ethyl silicate 40. This siloxane has an average chain length of 5 silicon atoms and is a condensed form of tetraethyl orthosilicate.

In carrying out the reaction to form polymers of my invention, I first mix the alkoxy aluminum compound with the ligand. Exotherm occurs generally to about 150° F., at which time the chelate has formed.

After the chelate is formed, the silicon compound is added and the mixture is heated (with stirring) to 100°–450° F. It was found that about 48 to 72 hours at 100° F. was required to generate a useful polymer. At 450° F. about four hours was required to generate a useful polymer. Examination by infrared indicated the polymers generated under either condition was the same.

During the heating, volatile materials are allowed to escape from the vessel. These may be condensed in condensing equipment but this is not necessary. Continued heating advances the polymer to the stage that a sample, when withdrawn and cooled, is found to be hard, brittle and glassy. The polymer is completely soluble in organic solvents.

The presence of both aluminum and silicon is essential. The ratio of aluminum to silicon is not critical, however, for commercial practice between 0.6 mol of silicon with 2.8 mols of aluminum and 1.5 mols of silicon and 1 mol of aluminum.

Large volumes of volatiles are given off during the polymerization. These volatiles are predominantly ethers. It is theorized that the alkoxide group of the aluminum alkoxide reacts with the alkoxide group of the siloxane as shown below:

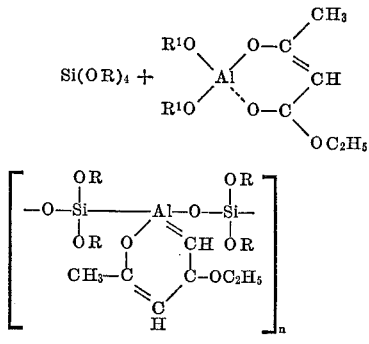

EXAMPLE 1

|  | Pounds |
|---|---|
| Aluminum sec butoxide | 1680 |
| Ethylacetoacetate | 888 |
| Ethyl silicate 40 (Union Carbide) | 2568 |
| Ethylene/glycol/monoethyletheracetate | 948 |

The aluminum secondary butoxide and the ethylacetoacetate were charged into a 1000 gallon stainless steel reaction kettle equipped with an agitator and condenser. The temperature of the ingredients rapidly rose to 150° F. The mixture was cooled to 80° F. and the ethyl silicate 40 was added. The contents of the kettle was then heated to 450° F. The heating was continued until the viscosity had reached 200 poises. During the heating, 2048 pounds of distillate was collected. The mixture was cooled to 300° F. and the ethylene glycol monoethyletheracetate was added. The resulting viscous clear liquid was found to floresce in ultraviolet light.

EXAMPLE 2

| | Grams |
|---|---|
| Aluminum sec butoxide | 32.71 |
| Tetraethyl orthosilicate | 50.00 |
| Ethyl acetoacetate | 17.29 |
| Toluene | 30.00 |

The aluminum sec butoxide was added to the ethyl acetoacetate. The mixture exothermed to 70° C. It was allowed to cool to 25° C. The tetraethyl orthosilicate was then added. The mixture was then transferred to a 500 ml. open beaker. The beaker was placed in an oven maintained at 60° C. After 96 hours the mixture had thickened to 150 poises. The toluene was added and the mixture was stirred to dissolve the resin.

EXAMPLE 3

| | Grams |
|---|---|
| Aluminum isopropylate | 102.1 |
| Ethyl acetoacetate | 115.1 |
| Ethyl silicate 40 (Union Carbide) | 188.0 |

The ethyl acetoacetate was charged into a 400 ml. beaker equipped with an electric stirrer. The aluminum isopropylate was slowly added with agitation. The mixture was agitated until the exotherm occurred and subsided. The ethyl silicate 40 was then added and the mixture heated to 100° C. After one hour the temperature was raised to 300° C. After 3 hours the viscosity of the resin had risen to 200 poises. The resin was then dissolved in an equal volume of xylene.

EXAMPLE 4

| | Grams |
|---|---|
| Aluminum sec butoxide | 65.4 |
| Ethyl acetoacetate | 34.6 |
| Dimethyldiethoxysilane | 100.0 |

The aluminum sec butoxide and the ethyl acetoacetate were mixed and allowed to exotherm. After cooling the dimethyldiethoxysilane was added. The mixture was heated to 52° C. and maintained at that temperature for 96 hours. The viscosity had increased to 100 poises. It was then dissolved in 125 ml. of xylene.

What is claimed is:

1. A polymer produced by heating at temperatures between 100° F. and 450° F. an alkoxysilane having the general formula $R_m{}^1Si(OR)_n$ wherein R and $R^1$ are monovalent hydrocarbon radicals and $n$ has a value of 1 to 4 and $m$ has a value of 0–2 with an aluminum alkoxide chelate, said chelate having the general formula $$XAl(OR)_2$$

wherein X is a ligand chosen from the group consisting of ethyl acetoacetate and 2,4-pentanedione.

2. A polymer produced by heating tetraethylorthosilicate with an alkoxy aluminum chelate at temperatures between 100° F. and 450° F., said chelate consisting of the reaction product of one mol of aluminum secondary butoxide with one mol of ethyl acetoacetate or 2,4-pentanedione at ambient temperature.

3. The composition of matter obtained by heating an aluminum isopropoxide chelate with tetraethyl orthosilicate at temperatures between 100° F. and 450° F., said chelate being prepared by mixing one mol of ethyl acetoacetate with one mol of aluminum isopropylate at room temperature.

References Cited

UNITED STATES PATENTS 3,481,899  12/1969  Marwitz et al. 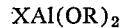 260—17.4

DONALD E. CZAJA, Primary Examiner

M. I. MARQUIS, Assistant Examiner

U.S. Cl. X.R.

117—161 ZA; 260—18 S, 33.6 SB, 46.5 E, 448 R, 448.2 N